Oct. 11, 1955  G. J. KELLY  2,719,972
COMBINATION VIEWING WINDOW FOR WELDING HOOD
Filed Jan. 27, 1953  2 Sheets-Sheet 2
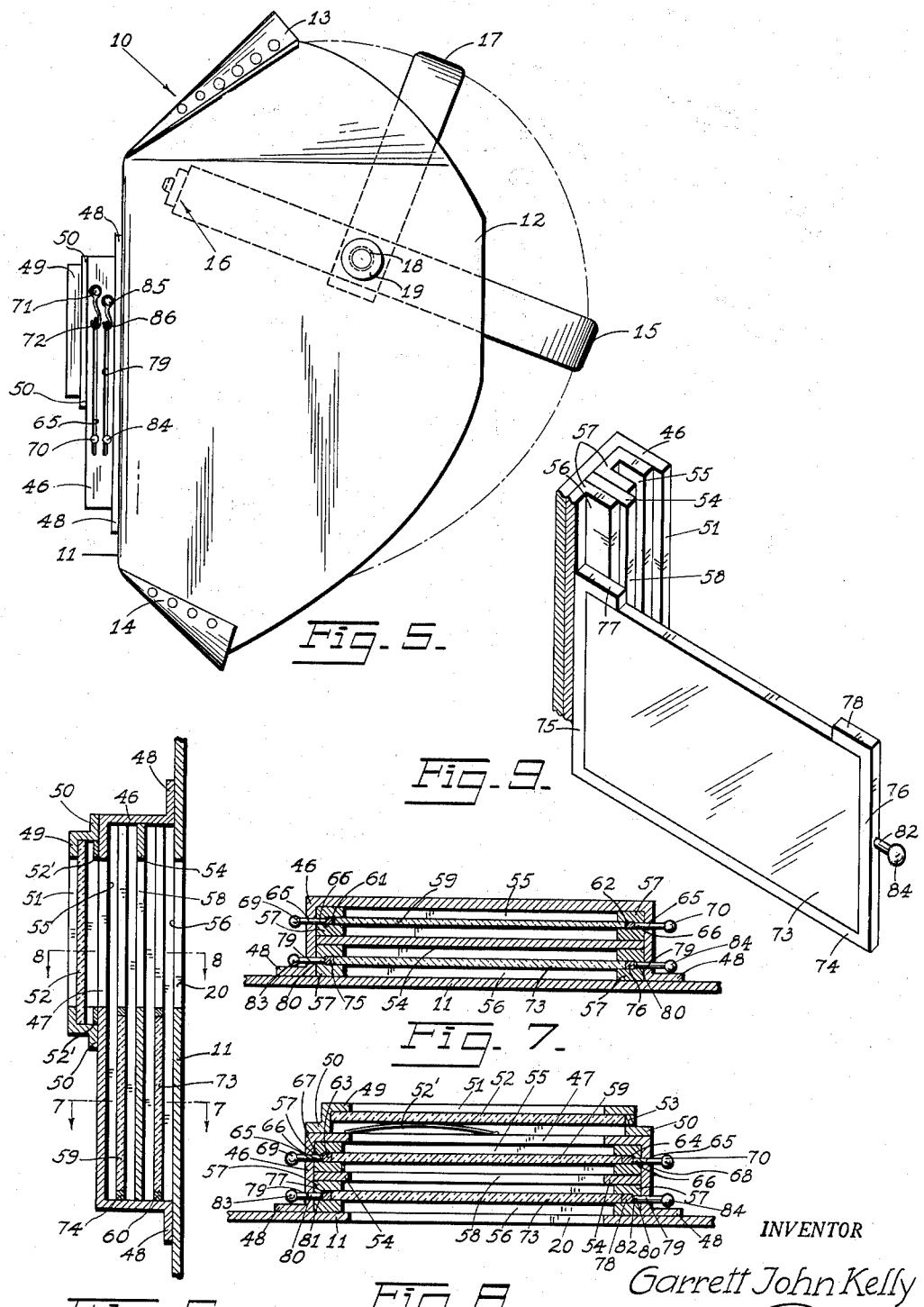
INVENTOR
Garrett John Kelly
BY
ATTORNEY

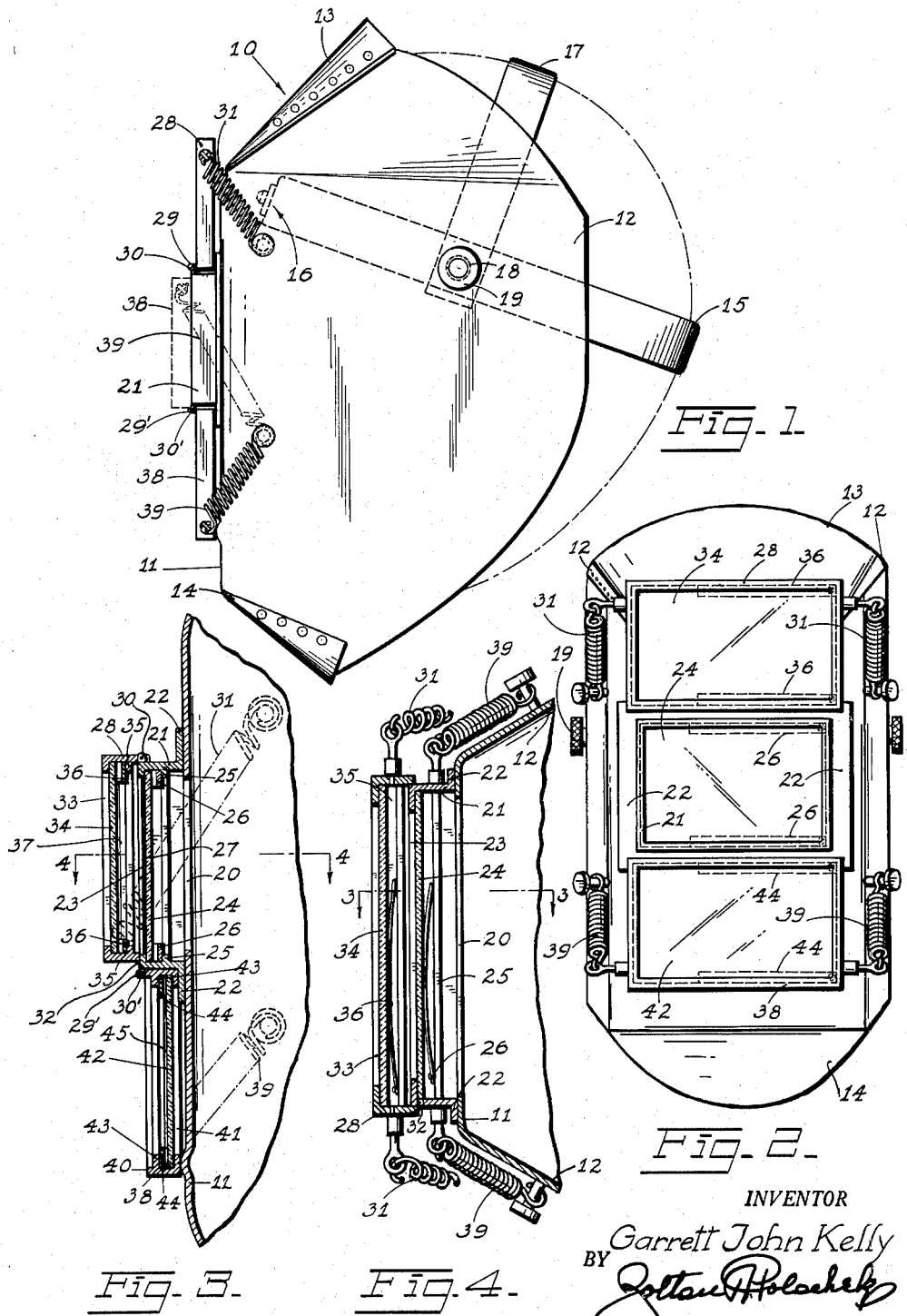

United States Patent Office 2,719,972
Patented Oct. 11, 1955

2,719,972

COMBINATION VIEWING WINDOW FOR WELDING HOOD

Garrett John Kelly, Astoria, N. Y.

Application January 27, 1953, Serial No. 333,540

2 Claims. (Cl. 2—8)

This invention relates to welding hoods and, more particularly, to combination viewing windows therefor.

It is a principal object of the present invention to provide a welding hood having readily interchangeable viewing windows, one of which is adapted for observing the burning of articles and the other of which is adapted for observing the welding of articles.

It is another object of the present invention to provide a welding hood of the above type in which the viewing windows are hinged above and below the eye opening of the hood so as to permit ready interchanging of these windows without removing the hood from the head of the wearer.

It is still another object of the present invention to provide a welding hood of the above type in which the viewing windows are slidably arranged so as to permit ready interchanging of these windows without removing the hood from the head of the wearer.

Other objects of the present invention are to provide a welding hood having combination viewing windows, which is of simple construction, inexpensive to manufacture, has a minimum number of parts, is easy to use and efficient in operation.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a welding hood embodying the features of the present invention and shown in operative use on the head of the wearer with both viewing windows in a vertical or inoperative position.

Fig. 2 is a front elevational view of Fig. 1.

Fig. 3 is a vertical sectional view taken along line 3—3 of Fig. 4.

Fig. 4 is a transverse sectional view taken along line 4—4 of Fig. 3.

Fig. 5 is a side elevational view of a modified form of the present invention and shown in operative use on the head of the wearer with both viewing windows in a lowered or inoperative position.

Fig. 6 is a vertical sectional view through the front wall of the hood shown in Fig. 5.

Fig. 7 is a transverse sectional view taken along line 7—7 of Fig. 6.

Fig. 8 is a transverse sectional view taken along line 8—8 of Fig. 6.

Fig. 9 is a fragmentary perspective view of the interior of the viewing window casing.

Referring more in detail to the drawings, in which similar reference characters designate corresponding parts throughout the several views, there is shown in Figs. 1–4 a welding hood, referred to collectively as 10, and including a shield adapted to be positioned about the front of the operator's head to protect the same during the welding operation.

The aforementioned shield comprises a front wall 11 disposed before the operator's face, side walls 12 protecting the sides of the head, a top portion 13 and an underlying portion 14 extending below the chin, all as well known in the art.

The shield is pivotally connected to and supported by a head harness including a head band 15 having its ends adjustable at the front of the head and held in adjusted position by screw clamping means 16, and a crown strip 17 extending over the top of the head and having its lower ends suitably secured to the side portions of the head band, all in the usual manner of welding hood construction.

The sides 12 of the shield are laterally spaced from the sides of head band 15, and are connected thereto by conventional friction pivot means including a clamping screw 18 and nut 19, substantially as illustrated in Fig. 1.

The front wall 11 has an aperture 20 about which is suitably secured a window frame 21 in registry therewith, the window frame 21 being secured to front wall 11 by means of flange 22 riveted or bolted to the marginal portions of front wall 11 surrounding aperture 20. The frame 21 has an aperture 23 which is closed by shadow-proof, clear glass 24 held in place by means of inwardly extending flanges 25 integrally formed in the upper and lower sides of window 21 and suitable springs 26 intermediate the flanges 25 and glass 24, substantially as illustrated in Figs. 3 and 4.

The window frame 21 is cut away as at 27 to permit the glass 24 to be inserted from the one side.

The top viewing window comprises the frame 28 provided with hinge lugs 29 which cooperate with hinge lugs 30 provided on the top of frame 21, substantially as illustrated in Fig. 1, whereby to hingeably mount the frame 28 on the top side of frame 21. Springs 31 are provided on each side of frame 28 and secured to the shield as shown for keeping the window frame 28 closed tightly against the frame 21, as shown in Figs. 1 and 3.

The bottom, inner edge of the frame 28 is cut away as at 32, to permit the same to nest on the outer portion of frame 21, as shown in Figs. 2 and 3.

The frame 28 has an aperture 33 which is closed by a number six or burning glass 34 held in place by means of inwardly extending flanges 35 integrally formed in the upper and lower sides of frame 28 and suitable springs 36 intermediate the flanges 35 and glass 34, substantially as illustrated in Figs. 3 and 4.

The window frame 28 is cut away as at 37 to permit the glass 34 to be inserted from the one side.

The bottom viewing window comprises the frame 38 provided with hinge lugs 29', which cooperate with corresponding hinge lugs 30', provided on the bottom of frame 21 whereby to hingeably mount the frame 38 on the bottom side of frame 21. Springs 39 are provided on each side of frame 38 and secured to the shield as shown for keeping the window frame 38 closed tightly against the frame 21, as shown in dotted lines in Fig. 1.

The upper, inner edge of frame 38 is cut away as at 40 to permit the same to nest on the outer portion of frame 21 when the former is in the vertical, operative position shown in dotted lines in Fig. 1.

The frame 38 has an aperture 41 which is closed by a number twelve or welding glass 42 held in place by means of inwardly extending flanges 43 integrally formed in the upper and lower sides of frame 38 and suitable springs 44 intermediate the flanges 43 and glass 42, substantially as illustrated in Figs. 3 and 4.

The window frame 38 is cut away as at 45 to permit the glass 42 to be inserted from the one side.

During the work, both windows may be extended to the vertical, inoperative position, as shown in Fig. 1, to permit the operator to inspect the work through clear glass 24. The springs 31 and 39 also serve to retain the viewing windows in the above inoperative positions, as shown in the drawing.

During the burning operation, the top viewing window comprising frame 28 and burning glass 34 is rotated down in front of clear glass 24, as shown in Figs. 3 and 4, the springs 31 serving to retain the top viewing window tight against the frame 21.

During the welding operation, the top viewing window is rotated up to the upper vertical, inoperative position and the bottom viewing window comprising frame 38 and welding glass 42 is rotated up in front of clear glass 24, as shown in dotted outline in Fig. 1, the springs 39 serving to retain the bottom viewing window tight against the frame 21.

Thus ready interchanging of the glasses 34 and 42 is permitted without the necessity of removing the hood from the head of the wearer, each of the above glasses being adapted to a different working condition.

In an alternate form, either the top or bottom viewing window can be eliminated and the clear glass 24 replaced by a number six or burning glass. The remaining hinged viewing window would then also contain a number six or burning glass. During the burning operation, the hinged window would be in a horizontal or inoperative position and the operator would view the work through the frame 21 containing a burning glass. During the welding operation, the hinged viewing window containing the other number six or burning glass would be rotated into the vertical or operative position and the operator would view the weld through two superimposed number six glasses, which are equivalent to a number twelve or welding glass.

Referring now particularly to Figs. 5–9, there is shown a modified form of the present invention, referred to collectively as 10', and differing from the first form in the arrangement of the viewing windows.

The front wall 11 has an aperture 20 about which is suitably secured an elongated window frame 46 having an aperture 47 in registry with the aperture 20, the window frame 46 being secured to the front wall 11 by means of flange 48 suitably riveted or bolted thereto and extending downwardly below the opening 20 substantially as illustrated.

A second window frame 49 is suitably secured to the top front of frame 46 by means of flange 50 suitably riveted or bolted thereto, the frame 49 having an aperture 51 in registry with apertures 20 and 47. The aperture 51 is closed by a shadow-proof, clear glass 52 held in place by means of suitable springs 52' intermediate the frame 46 and glass 52, substantially as illustrated.

The frame 49 is cut away as at 53 to permit the glass 52 to be inserted from the one side.

A partition 54 is disposed within the frame 46 and suitably secured therewithin along its edges, the partition 54 dividing the frame 46 into front and rear compartments 55 and 56, respectively.

Vertical tracks 57 are disposed at each end of compartments 55 and 56, extending substantially from top to bottom of frame 46.

The partition 54 is provided with an opening 58 in registry with openings 51, 47 and 20, as shown in Figs. 6 and 8.

Within the compartment 55 vertically slides a number six or burning glass 59 which is carried in a holder or frame having a bottom 60, vertical sides 61 and 62 and upper projections 63 and 64 overlying the upper corners of glass 59.

The frame 46, partition 54 and tracks 57 are elongated downwardly to provide an extension below the window frame 49 so as to provide space for the downward movement of glass 59 and its carrier and a second glass to be hereinafter described.

The vertical sides 61 and 62 and the vertical edges only of glass 59 slide within tracks 57, the main front and rear faces of glass 59 thereby being freely spaced from partition 54 and front of frame 46 and avoiding scratching and marring of glass 59.

Aligned, vertical slots 65 and 66 in frame 46 and tracks 57 are provided at each side of the carrier and slidably receive pins 67 and 68 fixedly carried by the vertical sides 61 and 62 thereof. The pins 67 and 68 are provided with knobs 69 and 70 permitting manual adjustment of the vertical position of glass 59 and its carrier within the tracks 57.

A pin 71 is secured to the outside of frame 46 above the top end of slot 65 and fixedly and swingably carries a clamp hook 72 adapted to engage the knob 70 when the glass 59 is in the raised or operative position whereby to retain the same in the aforesaid position.

Within the compartment 56 vertically slides a number six or burning glass 73 which is carried in a holder or frame having a bottom 74, vertical sides 75 and 76 and upper projections 77 and 78 overlying the upper corners of glass 73.

The vertical sides 75 and 76 and the vertical edges only of glass 73 slide within tracks 57, the main front and rear faces of glass 59 thereby being freely spaced from partition 54 and front of wall 11 and avoiding scratching and marring of glass 73.

Aligned vertical slots 79 and 80 in frame 46 and tracks 57 are provided at each side of the carrier and slidably receive pins 81 and 82 fixedly carried by the vertical sides 75 and 76 thereof. The pins 81 and 82 are provided with knobs 83 and 84 permitting manual adjustment of the vertical position of glass 73 and its carrier within the tracks 57.

A pin 85 is secured to the outside of frame 46 above the top end of slot 79 and fixedly and swingably carries a clamp hook 86 adapted to engage the knob 84 when the glass 73 is in the raised or operative position whereby to retain the same in the aforesaid position.

During the work, both glasses 59 and 73 and their respective carriers may be lowered to the inoperative position as shown in Figs. 5–8 to permit the operator to inspect the work through clear glass 52.

During the burning operation, either the glass 59 or glass 73 is slid upwardly to the operative position by means of knobs 69 and 70 or 83 and 84 and retained in the upward position by clamp 72 or 86.

During the welding operation, the other glass is slid upwardly to the operative position and retained therein by the aforementioned clamps, the operator viewing the work through two superimposed number six glasses, which so positioned are equivalent to a number twelve or welding glass.

Thus ready interchanging of the glasses 59 and 73 is permitted without the necessity of removing the hood from the head of the wearer, either of the above glasses taken alone being adapted to one working condition while taken in combination with each other they are equivalent to another working condition.

It will be noted that when the glasses 59 and 73 are in the lowered, inoperative position they are protected by the front wall of frame 46 below the opening 47 therein.

In an alternate form, the extension of frame 46, compartment 54 and tracks 57 could be placed above the window frame 49 instead of therebelow as shown in Figs. 5–9.

Alternately, the frame 46 could be extended both above and below the frame 49 and provided with only a single pair of tracks 57 with the partition 54 eliminated, the upper extension slidably containing a number ten or twelve welding glass while the lower extension would contain a slidable number four or six burning glass. In this case the front wall of the extended portions of frame 46 would protect the colored glasses when not in use.

In a still further modified form, the frame 46 could be extended only above the window 49 to slidably house a number six or burning glass adapted to be slid down in alignment with the clear glass, while a third viewing window could be hingeably mounted below the clear glass and adapted to be rotated upwardly in front of the clear glass. Such a third viewing window would also contain a number six or burning glass, and when superimposed in front of the downwardly slid number six burning glass would be equivalent to a number twelve or welding glass.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a welding hood having a substantially rectangular-shaped opening therein for observing the work, a first substantially rectangular-shaped window frame secured to said hood and surrounding said opening on the top and vertical sides thereof, said first frame extending downwardly below the bottom of said opening, said window frame having a second opening in registry with said hood opening, a clear glass, means for mounting said clear glass in front of said first window frame in alignment with said hood opening, a vertical partition within said first frame dividing the interior of said frame into front and rear compartments, vertical tracks at each vertical side of said front and rear compartments extending substantially the height of said first frame, said partition having an opening aligned with said first and second openings, a carrier having a transverse lower bar connecting and slidably located at its ends within said tracks in each compartment, said carriers having vertical side bars slidably located within said tracks with inwardly extending projections at the upper ends thereof, colored glasses located within each of said carriers above said lower bars and between said side bars with the corners of said glasses underlying said projections, and releasable means for retaining said colored glasses behind said clear glass, said last-mentioned means comprising said tracks at each side of said front and rear compartments and said first frame having aligned vertical slots, outwardly extending pins secured to the vertical sides of each of said carriers and adapted to slide vertically in said aligned slots, a knob secured to the outer end of each of said pins, and swingable clamps secured to the outside of said first frame above said aligned slots adapted to engage said knobs when said colored glasses are in the upper portion of said first frame.

2. In a welding hood having a substantially rectangular-shaped opening therein for observing the work, a first substantially rectangular-shaped window frame secured to said hood and surrounding said opening on the top and vertical sides thereof, said first frame extending downwardly below the bottom of said opening, said window frame having a second opening in registry with said hood opening, a second substantially rectangular-shaped window frame secured to the front of said first window frame and surrounding said second opening, a clear glass adapted to be inserted through an opening in the one side of said second window frame, said second window frame having vertical front flanges adapted to abut the front of said glass, springs interposed intermediate said front flanges and said glass at the top and bottom thereof for keeping said glass in position against said front flanges, a vertical partition within said first frame dividing the interior of said frame into front and rear compartments, vertical tracks at each vertical side of said front and rear compartments extending substantially the height of said first frame, said partition having an opening aligned with said first and second openings, a carrier having a transverse lower bar connecting and slidably located at its ends within said tracks in each compartment, said carriers having vertical side bars slidably located within said tracks with inwardly extending projections at the upper ends thereof, colored glasses located within each of said carriers above said lower bars and between said side bars with the corners of said glasses underlying said projections, said tracks at each side of said front and rear compartments and said first frame having aligned vertical slots, outwardly extending pins secured to the vertical sides of each of said carriers and adapted to slide vertically in said aligned slots, a knob secured to the outer end of each of said pins, and swingable clamps secured to the outside of said first frame above said aligned slots adapted to engage said knobs when said colored glasses are in the upper portion of said first frame.

References Cited in the file of this patent

UNITED STATES PATENTS

| | | |
|---|---|---|
| 1,191,562 | Callahan | July 18, 1916 |
| 1,306,550 | Malcom | June 10, 1919 |
| 1,683,170 | Dicarlo | Sept. 4, 1928 |
| 1,833,257 | Norton | Nov. 24, 1931 |
| 2,059,361 | Kenworthy | Nov. 3, 1936 |
| 2,171,052 | Tatter | Aug. 29, 1939 |
| 2,354,502 | Cockrill et al. | July 25, 1944 |
| 2,388,604 | Eisenbud | Nov. 6, 1945 |
| 2,400,993 | Hebeler | May 28, 1946 |
| 2,604,819 | Neller | July 29, 1952 |
| 2,634,416 | Fehrs | Apr. 14, 1953 |

FOREIGN PATENTS

| | | |
|---|---|---|
| 42,569 | Netherlands | Feb. 15, 1938 |
| 159,047 | Great Britain | Feb. 24, 1921 |
| 449,328 | Great Britain | June 24, 1936 |